April 18, 1939.  C. L'ENFANT  2,154,516
BINDING
Filed Oct. 3, 1936   5 Sheets-Sheet 1

INVENTOR.
Charles L'Enfant
BY
his ATTORNEY.

April 18, 1939.  C. L'ENFANT  2,154,516
BINDING
Filed Oct. 3, 1936  5 Sheets-Sheet 2

INVENTOR.
Charles L'Enfant
BY
his ATTORNEY.

April 18, 1939.                C. L'ENFANT                2,154,516
                                  BINDING
                            Filed Oct. 3, 1936          5 Sheets-Sheet 3

INVENTOR.
Charles L'Enfant
BY C. P. Gripel.
his ATTORNEY.

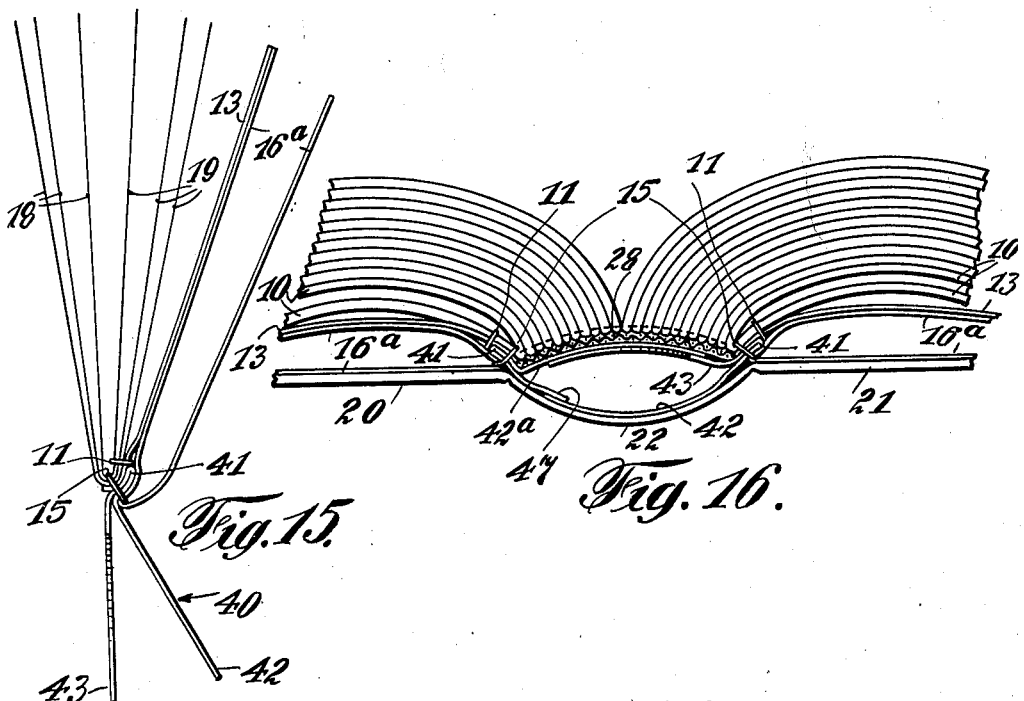

INVENTOR.
Charles L'Enfant
BY
ATTORNEY.

Patented Apr. 18, 1939

2,154,516

UNITED STATES PATENT OFFICE 2,154,516

BINDING

Charles L'Enfant, New York, N. Y.

Application October 3, 1936, Serial No. 103,874

2 Claims. (Cl. 281—21)

This invention relates to a binding by which when the cover and book are glued together a binding that is very strong and enduring, is created.

The invention consists in the joining together of the signatures of a book in a novel manner and also includes the formation of a new tunnel which novel tunnel may be used either independently of or together with the invention embodied in the signatures.

The invention will be further described hereinafter and embodiments thereof shown in the accompanying drawings, and finally claimed in the subjoined claims.

More particularly the binding consists in first taking a signature and opening the same substantially in the middle of its pages so that an equal number of pages is at the central or bend line of the pages, then placing a piece of paper of the same size as the sheets of paper forming the pages over the outside sheet of the pages, stitching the page sheets to the piece of paper at a line offset from the median or bend line; then placing a piece of composition material upon the exterior surface of the piece of paper, stitching the page sheets with piece of paper to the composition sheet through the median or bend line of the pages, then bending one-half of the paper sheet and one-half of the composition sheet, over to the other half of the composition sheet, whereupon a novel end signature is provided, ready to be joined by the usual process of signature sewing to the other signatures forming the book, there being one such novel signature for the end of the book.

A second form is to place a strip of muslin or the like upon the sheet of paper, with one edge of the strip along the median or bend line of the page sheets, said strip extending from the top or bottom of the pages, this strip being preferably glued on to the sheet of paper, and in the form in which the muslin is used, having the offset line of stitching pass through the muslin also.

A further feature of my new binding is to paste over the bound signatures a piece of muslin, having flaps extending beyond the book or signatures, then placing a tunnel material over the muslin piece, then applying the signatures with the muslin and its loose flaps to a cover, then securing the tunnel material to the back or flexible part of the cover, then securing the flaps of the muslin to the cover leaves and pasting the free ends of the composition sheets to the stiff parts of the cover, thereby completing the book, one-half of the sheet of paper being preferably cut off.

My novel binding consists in having the end signatures each secured off-center to a piece of paper or muslin, and secured on the center line to a piece of composition lining, the paper or muslin being secured by adhesive to the one-half of the composition lining adjacent thereto, and the other half of the composition lining being secured to the inner part of the cover of the book by adhesive.

A further embodiment consists in applying to the back of the bound signatures, a piece of muslin having flaps extending beyond the book, said flaps being secured to the stiff parts of the cover by adhesive, and covering said flaps by the composition lining sheet.

Still another embodiment consists in the form in which the back of the book muslin is stitched to a piece of tunnel material having extending flaps, which flaps are secured by adhesive to the flexible part of the book cover.

Additional modifications of my invention will be hereinafter found in the description, and incorporated in the subjoined claims.

In the accompanying drawings:

Fig. 5 shows the same parts joined by adhesive or the like;

Fig. 15 shows the parts depicted in Fig. 14, bent to form an end signature;

Fig. 16 is a view of a complete book depicting the modified form of tunnel applied thereto;

Fig. 17 is also an end view of a book proper with the parts forming the tunnel in open position;

Fig. 18 is a similar view with the tunnel parts in closed position;

Fig. 19 is a side view of the tunnel improvement corresponding to that shown in Fig. 17;

Fig. 20 is a side view of the improved tunnel similar to that shown in Fig. 18;

Fig. 21 is a perspective view of the improved completed book embodying my invention;

Figures 1, 2:
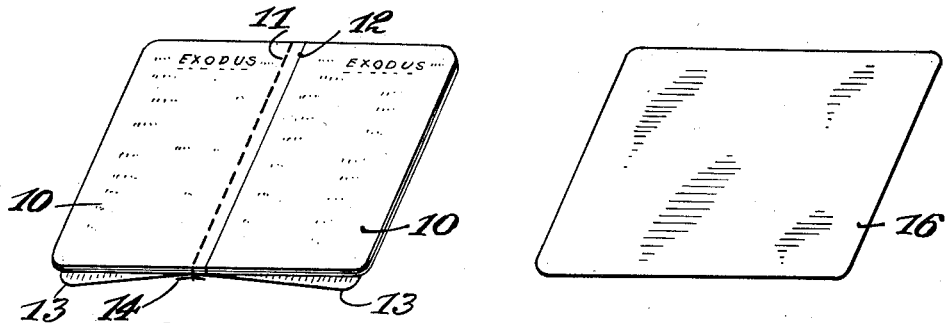
Figure 1 is a perspective view of an end signature in combination with a piece of paper, used as a preliminary covering.
Fig. 2 is a perspective view of a sheet of composition or like material, used as a lining member.
Figure 3:
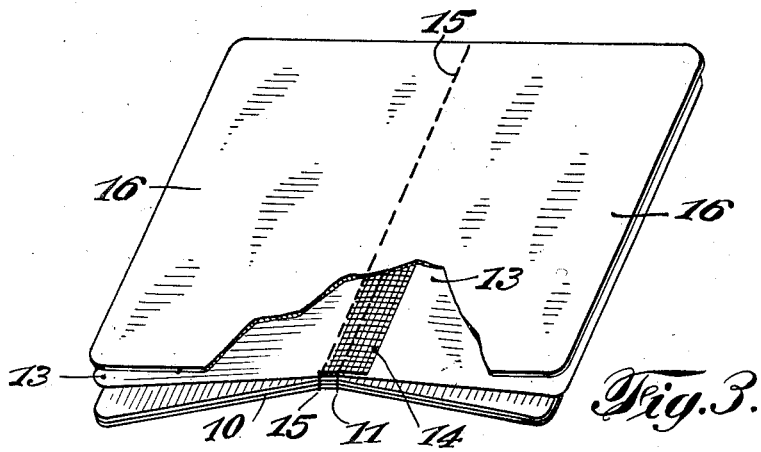
Fig. 3 is a perspective view of an end signature with the paper sheet depicted in Fig. 2, having the composition lining member applied thereto.
Figure 4:
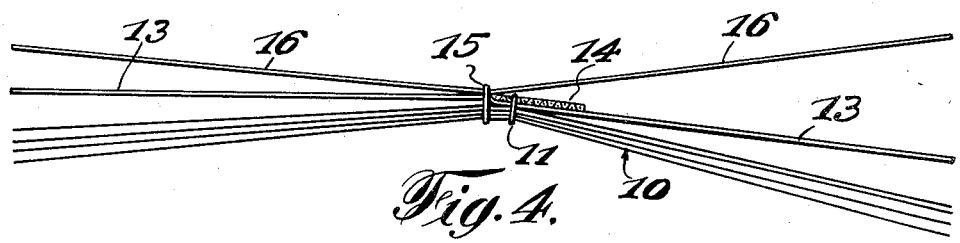
Fig. 4 is an end view of Fig. 3 showing the parts prior to their joining by adhesive.
Figure 5:
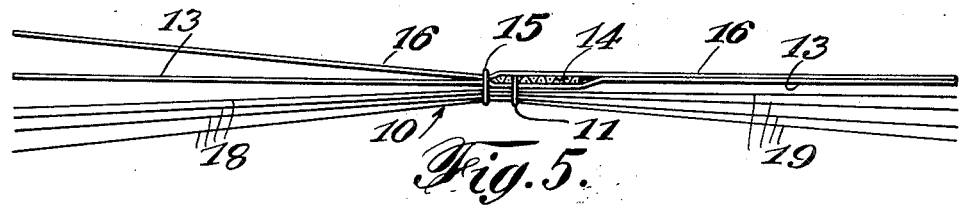
Figures 6, 7:
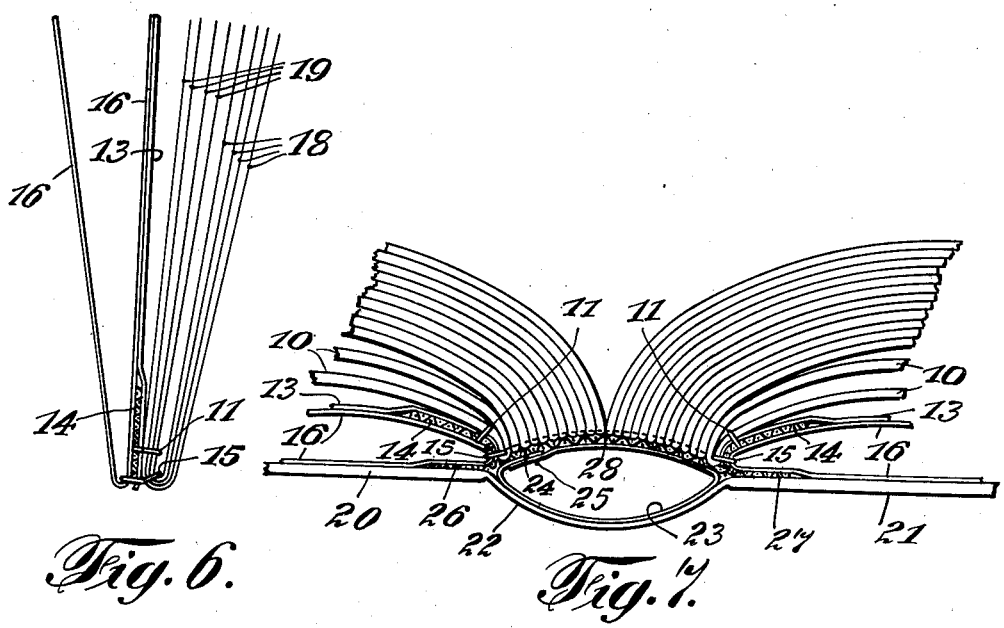
Fig. 6 shows the parts depicted in Fig. 5 bent to form an end signature.
Fig. 7 is an end view of a complete book showing the book portion with two end signatures, all joined to a cover.
Figure 13:
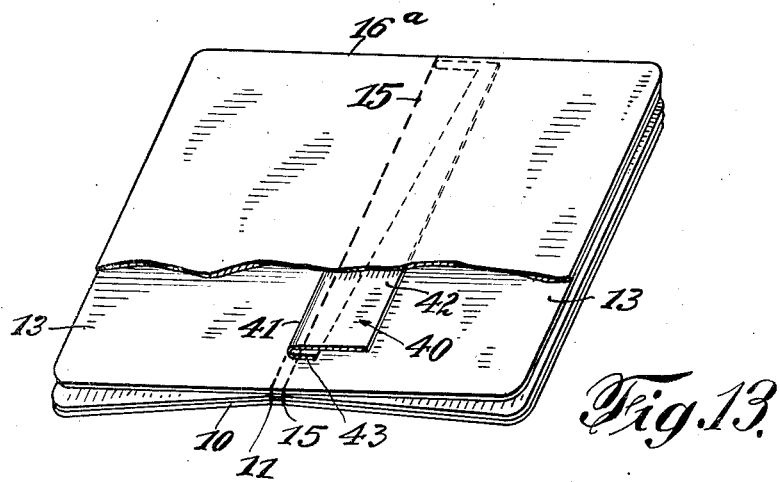
Fig. 13 is a perspective view of another form of tunnel improvement.
Figure 14:
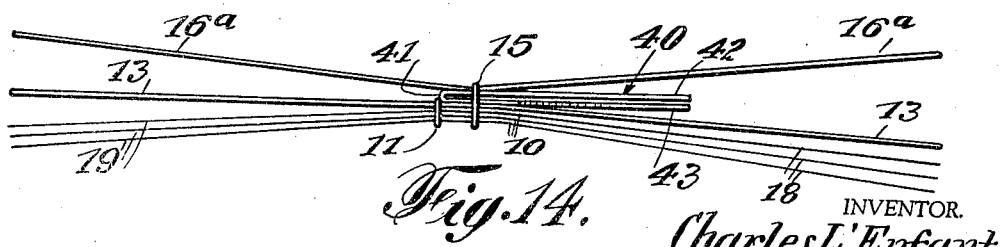
Fig. 14 is an end view which embodies the last-named modified tunnel construction.
Figure 8:
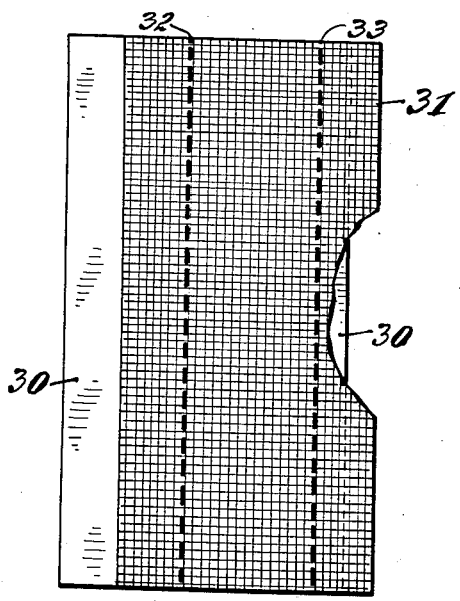
Fig. 8 is a plan view of the member used to form the improved tunnel of my invention.

Referring to the drawings, and more particularly to Figs. 1 to 7, a signature 10 is applied in the usual manner with a line of stitching 11 offset from the center line 12 of the signature. In the embodiment shown in Fig. 1, the signature 10 has secured thereto, by a line of stitching 11, a paper covering 13 having substantially the same contour as the contour of the signature 10. Preferably there is placed over this piece of paper 13, a narrow strip of muslin 14 whereby the stitching 11 passing through the signature and the paper covering 13 is made more secure, this strip 14 extending the full length of the signature. The narrow strip of muslin 14 is glued to its adjacent sheet of paper 13. Subsequently one-half of the paper layer 13 is torn off at the median line 12, as shown in Fig. 6 of the signature and the other half on which the muslin is secured remains intact as part of the ultimate book. Then to the signature and over the paper layer and piece of muslin, there is applied a layer of composition or lining 16 which is secured by a line of stitching 15 passing through the median line of the signature, as seen in Figs. 3 and 4. The lining 16 is pasted over the strip 14 and also over the exterior side of the paper layer 13, all as shown in Figs. 4 and 5. The remaining part of the composition cover 16 is not pasted to the paper layer since that half of the paper layer is torn off immediately after the pasting operation.

When the parts are assembled, as shown in Fig. 5, the pages 18 of the signature 10 are folded over upon the other pages 19 of the same signature, and the left hand exterior layer 16 is folded over in the opposite direction towards the right hand layer 16, as shown in Fig. 6. The structure as described constitutes one end signature, namely, one back or front signature with the invention therein embodied. Assuming the structure shown in Fig. 6 to be a front signature, another signature also embodying the invention but in reverse arrangement to form the back signature, is then made up. Whereupon, all the remaining signatures of the book are brought together in numerical order with the bottom or back signatures lowermost and the front or top signatures uppermost. All of these intervening signatures together with the front and back signatures each embodying the invention, are then subjected to a stitching machine which stitches all of the signatures together in a manner well known.

After the signatures have all been stitched together, a layer of muslin or the like is applied to the exterior of the signature edges so as to cover the same and to cover the stitching for the purpose of holding the book firmly. This application of a layer of muslin is done by means of adhesive or the like. This layer of muslin is clearly shown in Fig. 7 by the reference character 28, and comprises two extending portions one on each side of the book, indicated by the characters 26 and 27.

After the book is completed, as described, with the layer of muslin 28 at the rear of the stitched portion thereof and extending portions 26 and 27 intact, any form of cover may now be applied to the book. Such a cover usually consists of two relatively stiff portions, as 20 and 21 and a more flexible portion 22. In Fig. 7, it will be seen that the tunnel 23 is formed of a single layer of composition material or the like having overlapping ends 24 and 25 which are secured together by adhesive, and the material forming the tunnel is secured by adhesive to the layer of muslin 28. This form of tunnel is well known. The entire interior surface of the cover has then applied thereto adhesive or the like, and is applied to the book so that the interior part of the flexible portion 22 with its adhesive, contacts with the exterior portion of the tunnel and the interior portion of covers 20 and 21 contact with the extensions 26 and 27 and with the lining members 16—16 of the book. Pressure is then applied to secure all these parts together, causing the book proper to be completed.

The joining of the lining 16 by means of the muslin layer 14 and the stitching 11, makes these parts an integral portion of the end signatures and brings about a very secure form of particular construction, as shown in Figs. 3 and 7. This form of construction combined with the securing of the exterior layer 28 to the interior portions of the book cover further secures the parts together and provides a very strong wear-resisting binding. It will be also particularly noted that the lining member 16 of composition material or the like is stitched to the end signatures and secured by adhesive to the inner part of the cover.

Figure 10:
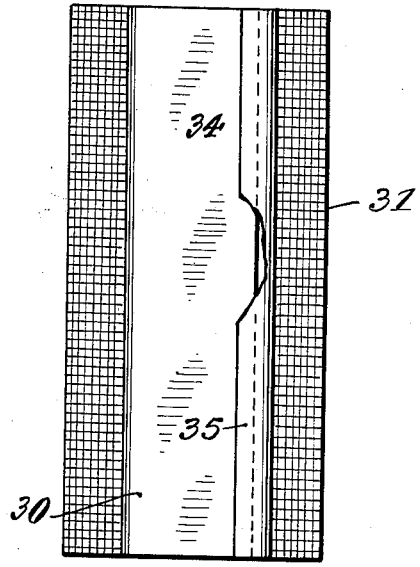
Fig. 10 is a detailed view of the parts shown in Fig. 8, depicting the tunnel-shaped improvement.
Figure 9:
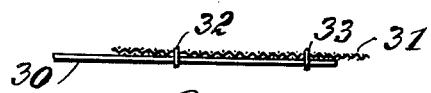
Fig. 9 is an end view of the structure shown in Fig. 8.
Figure 11:
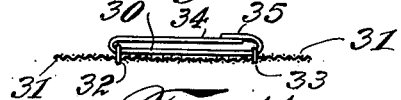
Fig. 11 is an end view of Fig. 10.

In Figs. 8 to 12, an improvement in the tunnel section of the book depicted in Fig. 7, is shown. This tunnel is made by providing a layer of composition material or the like indicated by reference character 30, in Fig. 1. To this layer of composition material or the like, a layer of muslin indicated by reference character 31, is fastened by two parallel lines of stitching 32 and 33. The layer 30 is then formed into tube-like formation with the free end portions overlapping, one free end 34 being larger than end 35, as shown in Figs. 10 and 11. However, this is immaterial as the ends may be either equal or unequal, the main feature being its tube-like shape, Muslin layer 31 takes the place of the muslin layer 28 and extension 26 and 27 of the embodiment shown in Fig. 7. After the signatures have been joined in book form with the front and back signatures embodying the improvement before described, the muslin layer 31 with the tube-like layer thereon, as shown in Fig. 11, is applied by adhesive to the edges of the signatures and the stitching so as to hold the signatures together.

Figure 12:
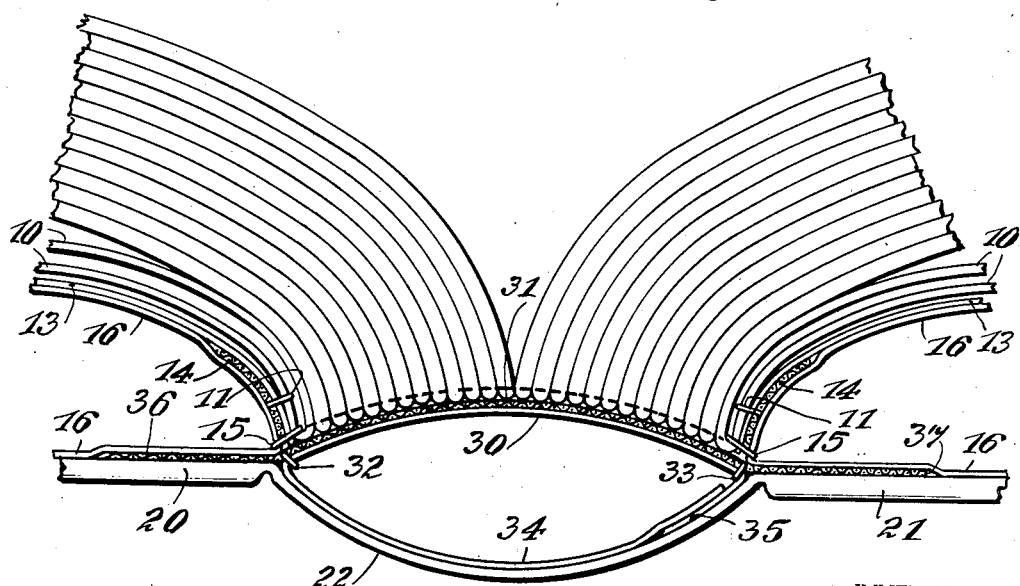
Fig. 12 is an end view of a complete book embodying my invention and including my improved tunnel feature.

In Fig. 12, this muslin layer 31 is clearly shown applied to the edges of the signatures and the free ends of the muslin layer are indicated by the reference characters 36 and 37. After this muslin and the tube supported thereby have been applied to the signatures, the covering member is then applied in the same manner as heretofore described, the interior part of the cover members 20, 21 and 22, having been supplied with adhesive which contacts with the exterior portion of the tunnel members 34 and 35, with the extensions 36 and 37 and exterior portions of the layer 16, and after all of these parts have been suitably pasted the entire book is complete and remains in this same secure condition for an indeterminable period of time. From the foregoing, it will be seen that the particular point of the improvement is to secure by stitching or the like a composition layer or the like, to the top and bottom signatures, and in respect to the tunnel that the muslin portion of the tunnel forms part of the signatures by fastening with adhesive or the like, and that the tunnel has extensions 36 and 37 which are secured to the cover and also held by adhesive and in turn covered by the composition layers, from which it will be seen that a very efficient construction of book has been provided.

In Figs. 13 to 21, a modified form of tunnel is shown. This consists in binding in with the composition layer 16a, shown in Figs. 13, 14, and 15, a top layer of fabric material indicated by 40. This layer 40 is folded upon itself as shown at 41 and is stitched to the fabric member 16a by the aforementioned stitching 15, and has two extending portions 42 and 43. As both end signatures are brought together as shown in Fig. 16 the innermost members forming the tunnel members assume a tapering form, as shown in Fig. 19 where one member 42a of one end signature is widest at the top and tapers down to its small lowermost end, whereas the other tunnel members 43 of the other end signature is narrowest at the upper end and tapers to its largest and widest portion at the lowermost portion thereof. The advantage of this construction is that the signatures will not break at one single line, but the breakage would take place among the inclined line 45 where the two tunnel members 42a and 43 overlap and are secured together by glue. The other free ends of the tunnel members 42 and 47 of the two end signatures are also respectively joined by adhesive so as to form the tunnel and after the parts are assembled, as shown in Fig. 16, the cover of the book is applied by means of adhesive, as already described.

Figure 22:
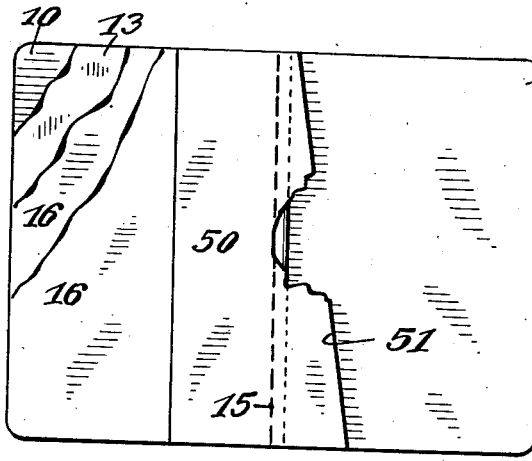
Fig. 22 is a plan view of certain parts of the book signature showing another embodiment of the tunnel construction.
Figure 24:
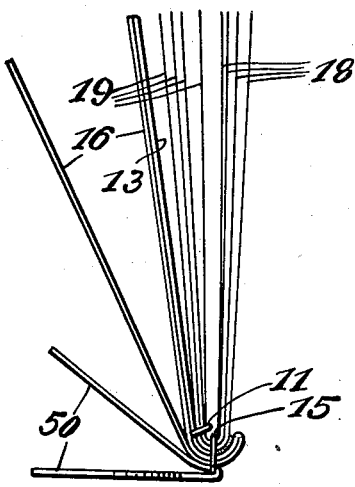
Fig. 24 is similar to Fig. 23 with the parts in readiness to be applied to other signatures.
Figure 23:
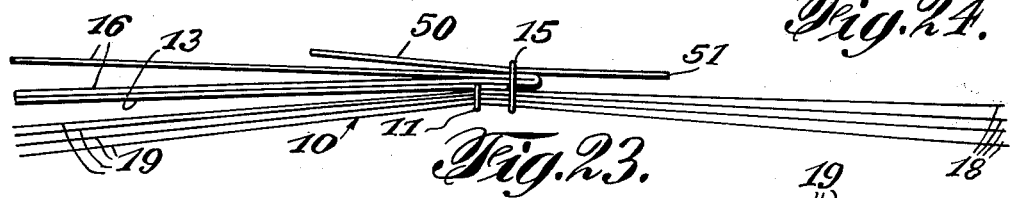
Fig. 23 is an end view of Fig. 22 with the modified tunnel construction and the parts in one position.

Another form of tunnel construction is shown in the embodiment of Figs. 22 to 24, where the fabric layers 16 are arranged, as shown in Fig. 23, and to the folded portion thereof a layer of composition material or the like is applied which forms the tunnel. This tunnel layer 50 is secured to the composition lining member 16 by the same line of stitching heretofore described and indicated by reference character 16 along the center line of the signatures. This tunnel layer 50 is then folded into shape, as shown in Fig. 24, and when in the position shown in Fig. 24, it is used to form the tunnel. Naturally Figs. 22 to 25 show only one of the end signatures with the tunnel member and when the end signatures are joined together with the intervening signatures to form the book, these tunnel members 50 cooperate together by having one of the tunnel members 50 inclined as shown by reference character 51 in Fig. 22 and thereby the advantage of the protection to the signatures is obtained.

Figure 25:
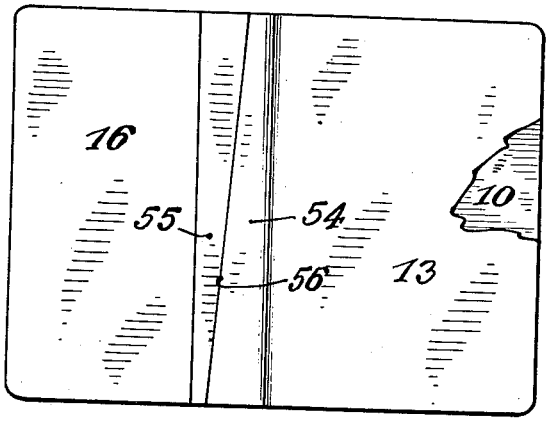
Fig. 25 is a plan view of the tunnel construction in an additional embodiment thereof.
Figure 27:
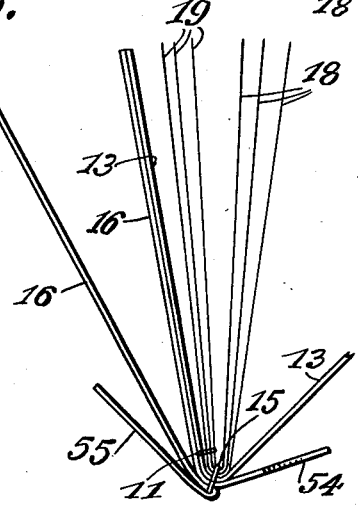
Fig. 27 shows the end signature and additional tunnel embodiment ready to be joined to other signatures.
Figure 26:
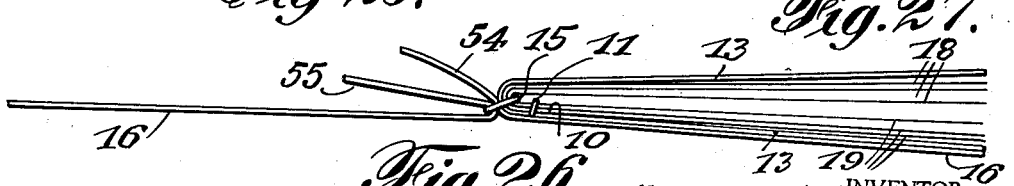
Fig. 26 is an end view of Fig. 25 showing the additional embodiment of the tunnel construction.

In Figs. 25 to 27, another embodiment of a tunnel member is shown and this consists in extending the inner end of the composition lining member 16 to form an extension 54 and the other composition lining 16 also has an extension 55. Stitching along the center line, designated by 15, joins the composition members 16 and extensions 54 and 55, as shown in Fig. 26. When the embodiment or structure shown in Fig. 26 is shaped to the form shown in Fig. 27, the free ends or extensions 54 and 55 act to form the tunnel members of one signature, and as before explained the similar extensions of the tunnel material of the other end signature cooperate to form the tunnel with an inclined joining line, indicated by 56, and as show in Fig. 25. This inclined joining line 56 of the tunnel members is the part that joins the edges of the signatures.

From the foregoing, it will be seen that various forms of tunnel members are made possible, and any one of the forms shown in Figs. 13 to 27 may be embodied in the structure shown in Fig. 12, although the form shown in Fig. 12 is the preferred form of the invention.

It will also be noted that the invention is carried out by always having a pair of signature members, this pair being called either front and back or top and bottom signatures between which a series of ordinary signatures are interposed so that when the signatures are joined by the usual stitching machine the intervening signatures as well as the end signatures (top and bottom or front and back), are at the same time stitched together.

This structure as before stated, brings about a very strong book construction and by book is understood the signatures which are joined together before cover is applied. By combining with this improved book construction, the further improvement of the tunnel construction or formation, any one of the various forms disclosed results. A very efficient and enduring book construction is provided.

It will have been noted that each end signature is first stitched to a piece of muslin by a line of stitching which is off the center line of the signature and that the composition member is stitched to the signature by means of a center line of stitching. The lining members are thereby secured to the signatures.

My invention has been illustrated and described with some degree of particularity, but it is understood that changes may be made in the form of details and in the construction and arrangement of the parts. Accordingly, I reserve the privilege of resorting to all such legitimate changes therein, as may be fairly incorporated within the spirit and scope of the appended claims.

I claim:

1. A book comprising inner signatures, end signatures, and means securing the signatures together, said end signatures comprising sheets folded upon themselves along their median line, an outer folded sheet of composition fabric, stitching securing the inner portion of said outer sheet to an end signature outwardly of the folded portion thereof, said stitching engaging through one-half of the sheets of said end signature, a cover adhesively secured to one-half portion of said outer fabric sheet and a tubular tunnel member adhesively secured to the folded end portions of said inner and end signatures and to that portion of said cover confronting said inner and end signatures.

2. A book comprising inner signatures, end signatures, and means securing the signatures together, said end signatures comprising sheets folded upon themselves along their median line, an outer folded paper sheet, a composition fabric sheet, stitching securing one portion of said folded paper sheet and said fabric sheet to one-half of the sheets comprising said end signature, one-half of said composition fabric sheet being adhesively secured to said outer paper sheet, a cover adhesively secured to the other half portion of said outer paper sheet and a tubular tunnel member adhesively secured to the folded end portions of said inner and end signatures and to that portion of said cover confronting said inner and end signatures.

CHARLES L'ENFANT.